United States Patent
Ross et al.

(10) Patent No.: US 6,618,680 B2
(45) Date of Patent: Sep. 9, 2003

(54) SIGNAL PROCESSOR APPARATUS FOR ROTATING WATER CURRENT METER

(75) Inventors: Jerry Hubert Ross, Waveland, MS (US); Eugene Clark Hayes, Diamondhead, MS (US)

(73) Assignee: The United States of America as represented by the Secretary of the Interior, Washington, DC (US)

( * ) Notice: Subject to any disclaimer, the term of this patent is extended or adjusted under 35 U.S.C. 154(b) by 0 days.

(21) Appl. No.: 09/851,523

(22) Filed: May 9, 2001

(65) Prior Publication Data

US 2002/0169568 A1 Nov. 14, 2002

(51) Int. Cl.⁷ .................................................. G01F 1/00
(52) U.S. Cl. .......................................... 702/45; 702/47
(58) Field of Search ..................... 73/195, 861; 702/45, 702/47, 100, 142

(56) References Cited

U.S. PATENT DOCUMENTS

| | | | |
|---|---|---|---|
| 4,282,883 A | 8/1981 | Yerushalmy | |
| 4,481,503 A | * 11/1984 | Lehman et al. | 340/518 |
| 4,658,832 A | 4/1987 | Brugnoli | |
| 4,940,976 A | 7/1990 | Gastouniotis et al. | |
| 5,016,273 A | * 5/1991 | Hoff | 380/10 |
| 5,553,493 A | 9/1996 | Box et al. | |
| 5,847,288 A | 12/1998 | Hutchinson | |
| 6,340,243 B1 | * 1/2002 | Deane et al. | 374/24 |
| 6,424,820 B1 | * 7/2002 | Burdick et al. | 455/41 |

* cited by examiner

Primary Examiner—John Barlow
Assistant Examiner—Douglas N Washburn
(74) Attorney, Agent, or Firm—Ross F. Hunt, Jr.

(57) ABSTRACT

The present invention comprises a hand held, battery operated water current velocity measuring device designed for use with contact closure water current meters. The apparatus differentiates and amplifies incoming DC signals generated by the current meter into both AC and DC signals, which are then sent to a microprocessor. The microprocessor, using operations research processing, samples and evaluates both signals to determine if a contact closure has occurred (e.g., when the current meter has completed a revolution) and to distinguish an actual contact from external voltage or spurious noise pulses. Once the microprocessor has verified the occurrence of a contact closure, the microprocessor alerts the operator to the contact closure. The information may be transmitted via FM band radio frequency to one or more appropriately tuned FM radios.

18 Claims, 2 Drawing Sheets

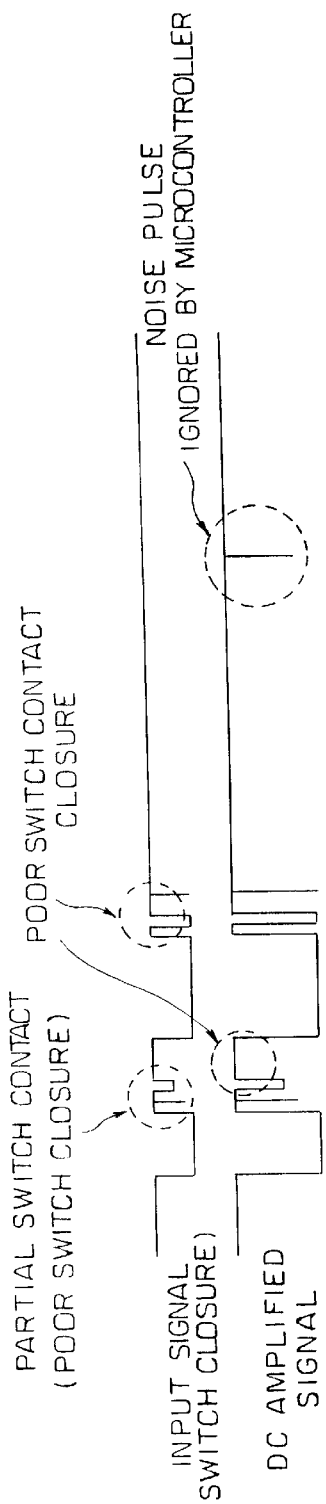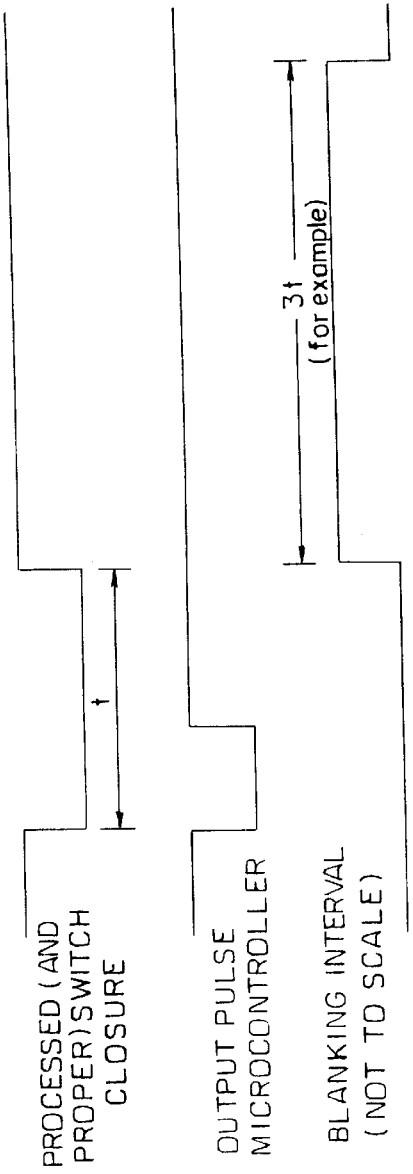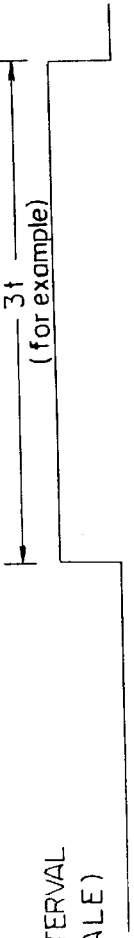

SIGNAL PROCESSOR APPARATUS FOR ROTATING WATER CURRENT METER

FIELD OF THE INVENTION

The present invention is directed to an apparatus for use with an instrument designed to measure water velocity.

BACKGROUND OF THE INVENTION

Conventional devices for measuring water velocity generally require a skilled operator to wade into a lake or stream and lower a switch contact closure type water current meter into the water with a wading rod or cable. Because operators must distinguish, via headphones, between spurious noise signals and actual contact closures, there are many opportunities for errors in velocity measurements. Additionally, many of these measuring devices rely upon cumbersome wiring to connect with operator headphones, creating significant potential for operator injury during the measurement process.

SUMMARY OF THE INVENTION

The present invention comprises a hand held, battery operated apparatus (a current meter signal processor, or CMSP), for use with a water current velocity measuring device, which provides more reliable measurements than conventional devices. It eliminates the need for a skilled operator and, because it provides for wireless transmission of information, reduces the risk of operator injury from cumbersome wiring. Additionally, the apparatus provides for automatic turn on and shut off.

The CMSP differentiates and amplifies incoming DC signals generated by the current meter into both AC and DC signals, which are then sent to a microprocessor. The microprocessor is equipped with software enabling it to utilize Operations Research (OR) processing. The microprocessor samples and evaluates both the AC and DC signals to determine if a contact closure has occurred (e.g., when the current meter has completed a revolution) and to distinguish an actual contact closure from external voltage discharges or spurious noise pulses.

Upon verification of the occurrence of a contact closure, the microprocessor activates a signal generator and a display block that alert the operator of the contact closure. Additionally, the apparatus provides means for transmitting the information via FM band radio frequency to one or more appropriately tuned FM radios.

DETAILED DESCRIPTION OF THE INVENTION

Figure 1:
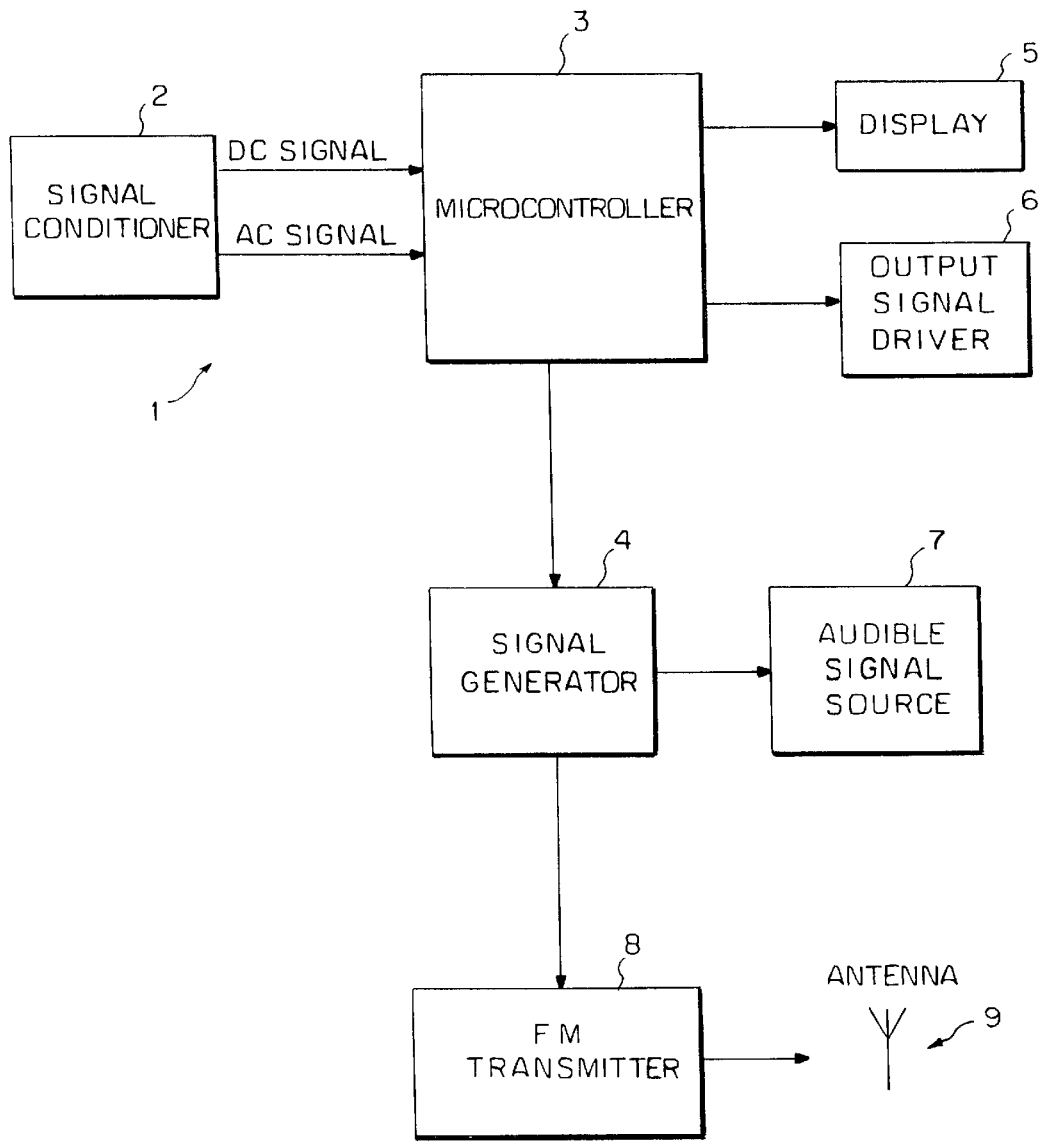
FIG. 1 provides a block diagram of the current meter signal processor (CMSP) and its various elements, FIG. 2 provides a schematic diagram of the input signal to be processed by the current meter signal processor (CMSP), FIG. 3 provides a diagram of the amplified DC signal leaving the internal signal conditioner, FIG. 4 provides a diagram of the amplified AC signal leaving the internal signal conditioner, FIG. 5 provides a timing diagram of a properly processed current meter switch closure, FIG. 6 provides a timing diagram of the output pulse sent by the microprocessor, and FIG. 7 provides a timing diagram (not to scale) of the blanking interval calculated by the microprocessor.

As shown in FIG. 1, the present invention provides a self contained, battery operated current meter signal processor (CMSP) apparatus for connection via cable to and for use with electromechanical devices, such as water current meters, that use contact closure for signaling. The CMSP provides a cable connection to any type of current meter or pygmy meter using a cat whisker, ball and wire, or reed relay switch contact closure. An internal signal conditioner 2, serves as the front-end interface between the current meter cable connections and the CMSP, and contains the appropriate electrical signaling and connections to interface to mechanical and optical meters. This signal conditioner, composed of an AC amplifier and DC amplifier, receives electrical signals from the current meter, amplifying and differentiating said signals into the AC and DC signals shown in FIGS. 3 and 4, respectively. A microprocessor or microcontroller 3 equipped with an analog-digital converter receives these amplified signals and converts each to a digital value. Software within the microprocessor enables the device to perform Operations Research (OR) sampling of the incoming AC and DC signals (individually and together) to determine, by change in voltage, if a contact closure has occurred at the current meter. By sampling potential closures numerous times, the microprocessor is able to distinguish actual contact closure signals, as shown in FIG. 5, from external voltage discharges or noise signals.

More specifically, the process by which the microprocessor samples incoming AC and DC signals is as follows:

The AC and DC currents are sampled and then examined individually. First, the incoming DC current is examined and, if a voltage change has occurred from the previous sample, the microprocessor establishes an internal flag and waits to sample both AC and DC input signals again. If, after sampling, no DC voltage change has occurred (e.g., in the event of a poor switch contact closure), the microprocessor then examines the AC signal sample. A change in AC signal voltage causes the microprocessor to establish another internal flag and wait to again sample incoming signals. When a suspected contact closure is detected, either in the DC or AC sample, the microprocessor sets the internal flag to ensure that the next n number of consecutive samples will validate that a change in voltage, and therefore a contact closure, has occurred. If, on the other hand, subsequent samples of incoming AC and DC signals do not indicate a voltage change, the microprocessor clears the internal flag and the process begins anew.

Hence, the microprocessor effectively performs an OR processing operation on the sampled signal, processing both the AC and DC input signals rather than the conventional method of merely examining the DC signal. Consequently, the likelihood of the CMSP interpreting spurious noise pulses or external voltage discharges (spikes) as actual switch contact closures is minimized.

Additionally, because the sampling process of incoming AC and DC signals necessarily slows the analysis thereof, it effectively creates a filtering process. Noise pulses, which usually occur as random, high frequency signals, are generally not observed by the microprocessor because it samples at a rate below the frequency of most noise pulses.

To further guard against falsely registering contact closures, the microprocessor, upon detecting a contact closure, calculates a blanking interval signal, as shown in FIG. 7. The blanking interval signal alerts the microprocessor that it is too soon for another contact closure to occur because the current meter must complete another revolution before another closure can occur. If, during the blanking interval, a contact closure is detected, the microprocessor registers this "new" contact closure as part of the previous contact closure. When the blanking time has elapsed, the microprocessor will recognize the new contact closure as a new one.

For example, the blanking interval may be set at 3 times the contact closure interval. If the microprocessor determines the contact closure to be 0.25 seconds, the calculated blanking interval is 0.23×3, or 0.75 seconds. The microprocessor computes this number for every input sample. Each sample represents a single count. The microprocessor establishes an internal counter and begins accumulating counts. For each sample, the microprocessor takes the accumulated counts and multiplies that number by 3. If a sample results in no detection of a contact closure (i.e., the switch is off or the switch is within a noisy contact interval) the microprocessor decrements the counts for the blanking interval. This operation continues until the calculated counts in the blanking interval reach 0. After completion of the blanking interval, the microprocessor will now recognize a subsequent contact closure as a new contact closure.

The blanking interval is dynamic, varying according to the detected total contact time of the current meter switch. The faster the switch contact closure, the shorter the blanking interval. This feature proves particularly useful when a current meter rotates very slowly. Often, in such situations, the meter is apt to reverse direction near the switch contact point. The creation by the microprocessor of a blanking interval prevents such reversals from being misinterpreted as a meter rotating at high speed.

Once the microprocessor recognizes and verifies the occurrence of a switch contact closure signal, as in FIG. 5, it signals the CMSP operator by activating the signal generator 4 and by illuminating the appropriate indicator in the display device 5. The microprocessor also provides to an output signal driver 6 a measuring signal free of extraneous artifacts inherent in the original input signal. The output signal driver, in turn, provides a signal sufficiently strong to transmit through a cable to a measuring instrument for counting and monitoring the revolutions of the current meter.

The signal generator, once activated by the microprocessor, sends an electrical signal to an audible signal source 7. As the current meter revolves, said audible signal source produces a tone audible to the CMSP operator.

Simultaneously, the audible signal source transmits a similar signal to the frequency modulation transmitter 8, producing an FM band radio frequency signal of the tone heard by the CMSP operator. An antenna 9 then transmits the signal to appropriately tuned FM radios, eliminating the need for wire transmission and permitting the simultaneous dissemination of information to several persons.

Therefore, this invention provides four means to observe the revolutions of the connected current meter, all of which can be individually selected for operation. If a signal is not received by the current meter within a short period of time, the microprocessor then switches off all power in order to conserve battery power. A touch of a switch turns the unit back on for testing and operation. The microprocessor performs self-tests on the connection to the current meter and checks general operation of the signal driver. When these tests are completed, the microprocessor turns on an indicator to-signal the user satisfactory operation. Pressing the same button also turns the unit off.

The CMSP can be used with any type of current meter contact closure mechanism producing a single, fixed pulse-width signal to the external measuring device. The rotational speed of the current meter is independent of the pulse-width output to the external measuring device, so that the CMSP will provide the same pulse-width output regardless of the rotational speed of the current meter to which it is attached. Only the frequency of the pulse width is 1:1 directly proportional to the rotational speed of the current meter.

The pulse is digitally clean, having no artifacts, regardless of the wire or reed-switch contact quality. The CMSP transmits a clean pulse to the measuring instrument or headphones without the use of attaching cables. An attached FM receiver permits the headphones and measuring instrument to receive the clean signal from the CMSP. More than one measuring instrument or headphone can receive the CMSP-processed signal simultaneously. A trained operator is not required to operate the CMSP.

The following are specific advantages of the present invention:

1. The CMSP operates on a battery, and is self-contained, requiring no additional external devices for its operation.
2. The CMSP permits wireless operation of tone signals from the measurements of the water current meter. These tone signals can be received by a common FM receiver tuned to the same frequency as the CMSP.
3. The CMSP has a greater sensitivity to the water current meter signal level than conventional measuring instruments designed for attachment to water current meters.
4. The CMSP contains a built-in test for troubleshooting and performance verification.
5. The CMSP provides visual, audible, and wireless audible indications of the revolutions of the water current meter.
6. The CMSP is equipped with a rotary switch that activates the audible signal source, the FM transmitter, or both.
7. No power switch is needed to turn the CMSP on or off. Instead, activation occurs when the CMSP is connected to the wading rod. Removing the CMSP from the wading rod turns the unit off.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be within the meaning and range of equivalents of the disclosed embodiments. It is to be understood that the phraseology or terminology employed herein is for the purpose of description and not of limitation. The means, materials, and steps for carrying out various disclosed functions may take a variety of alternative forms without departing from the invention.

Thus, the expressions "means to . . . " and "means for . . . ", or any method step language, as may be found in the specification above and/or in the claims below, followed by a functional statement, are intended to define and cover whatever structural, physical, chemical, or electrical element or structure, or whatever method step, which may now or in the future exist which carries out the recited functions, whether or not precisely equivalent to the embodiment or embodiments disclosed in the specification above, i.e., other means or steps for carrying out the same function can be used; and it is intended that such expressions be given their broadest interpretation

What is claimed is:

1. A self-contained, battery operated current meter signal processor (CMSP) for use with a contact closure device for measuring the velocity of water flow through a stream or river, wherein said CMSP is adapted to be connected to the contact closure measuring device via a cable, said CMSP comprising:
   a. a signal conditioner electrically connected to a microprocessor said signal conditioner serving as a front-end interface between the CMSP and the contact closure device;
   b. a microprocessor electrically connected to a display device, an output signal river, and a signal generator;
   c. A signal generator electrically connected to an audible signal source and electrically connected to an FM transmitter; and
   d. An antenna for transmitting radio frequency signals generated by the FM transmitter.

2. The device according to claim 1 wherein the display device of said CMSP may include an audio-visual display, visual display or combinations of both audio-visual and visual display.

3. The device according to claim 2 wherein said audio visual displays are selected from the group consisting of headphones, FM radios, and an electrical or mechanical visual display.

4. The device according to claim 1 wherein said signal conditioner contains appropriate electrical signaling and connections to interface with mechanical and optical contact closure type devices.

5. The device according to claim 1 wherein said signal conditioner comprises means for amplifying and differentiating into AC and DC current incoming electrical signals from a rotating current meter.

6. The device according to claim 1 wherein said microprocessor includes an AC/DC converter for converting AC and DC signals received from the signal conditioner into a digital value.

7. The device according to claim 1 wherein said microprocessor is equipped with software which performs operations research (OR) processing of incoming AC and DC signals to verify the occurrence of a contact closure in the current meter.

8. The device according to claim 1 wherein said microprocessor verifies the occurrence of contact closures by sampling n times the existence of voltage changes in incoming AC and DC signals.

9. The device according to claim 1 wherein said microprocessor establishes an internal flag upon registering a change in voltage after processing each signal sample.

10. The device according to claim 1 wherein said microprocessor registers the occurrence of a contact closure on the current meter when each of the n signal samples processed from said current meter register a change in voltage.

11. The device according to claim 1 wherein said microprocessor creates a dynamic blanking interval to guard against registering a contact closure between revolutions or periods of the current meter.

12. The device according to claim 1 wherein said microprocessor notifies the signal generator of the occurrence of a contact closure, and the signal generator transmits an electrical signal to the audible signal source.

13. The device according to claim 1 wherein said output signal driver electrically connects to the cable linking the CMSP and the current meter, and includes means to relay a signal through said cable to permit an operator to count and monitor the revolutions of the current meter.

14. The device according to claim 1 wherein the audible signal source generates and transmits operator-audible tones for monitoring current meter revolutions.

15. The device according to claim 1 wherein said audible signal source also transmits electrical signals to the FM transmitter.

16. The device according to claim 1 wherein said FM transmitter produces an FM band radio frequency signal for reception and simultaneous transmission, by the CMSP antenna, to at least one appropriately tuned FM radio.

17. The device according to claim 1 wherein said microprocessor performs self-tests on the connection of the CMSP to the contact closure device and checks the general operation of the signal driver.

18. The device according to claim 1 wherein said CMSP automatically starts or shuts down by connecting or disconnecting the signal processor to a wading rod or reel.

* * * * *